(12) United States Patent
Okamoto et al.

(10) Patent No.: US 7,772,382 B2
(45) Date of Patent: Aug. 10, 2010

(54) CHITOSAN DERIVATIVE AND METHOD OF PRODUCING SAME

(75) Inventors: Yoshio Okamoto, Aichi (JP); Chiyo Yamamoto, Aichi (JP); Masami Kamigaito, Aichi (JP)

(73) Assignees: National University Corporation Nagoya University, Nagoya, Aichi (JP); Daicel Chemical Industries, Ltd., Osaka-Shi, Osaka (JP)

( * ) Notice: Subject to any disclaimer, the term of this patent is extended or adjusted under 35 U.S.C. 154(b) by 221 days.

(21) Appl. No.: 11/887,521

(22) PCT Filed: Apr. 28, 2006

(86) PCT No.: PCT/JP2006/309357

§ 371 (c)(1),
(2), (4) Date: Sep. 27, 2007

(87) PCT Pub. No.: WO2006/121059

PCT Pub. Date: Nov. 16, 2006

(65) Prior Publication Data

US 2009/0062519 A1 Mar. 5, 2009

(30) Foreign Application Priority Data

May 9, 2005 (JP) .............................. 2005-135644

(51) Int. Cl.
C08B 37/08 (2006.01)
C08B 37/00 (2006.01)

(52) U.S. Cl. .......................... 536/20; 536/18.7; 514/55; 514/54

(58) Field of Classification Search .................... 536/20, 536/18.7; 514/55, 54
See application file for complete search history.

(56) References Cited

U.S. PATENT DOCUMENTS 4,861,872 A 8/1989 Okamoto et al.
4,912,205 A 3/1990 Okamoto et al.

FOREIGN PATENT DOCUMENTS

| JP | 63-178101 | 7/1988 |
|---|---|---|
| JP | 02-289601 | 11/1990 |
| JP | 03-284690 | 12/1991 |
| JP | 05-163164 | 6/1993 |
| JP | 2000-281703 | 10/2000 |
| JP | 2002-138101 | 5/2002 |
| JP | 2003-292502 | 10/2003 |
| JP | 2005-017174 | 1/2005 |
| JP | 2005-200531 | 7/2005 |

OTHER PUBLICATIONS

Hinou et al. (Tetrahedron Letters (1997), 38(46), 8041-8044) (Abstract sent).*

* cited by examiner

Primary Examiner—Leigh C Maier
Assistant Examiner—Michael C Henry
(74) Attorney, Agent, or Firm—Flynn, Thiel, Boutell & Tanis, P.C.

(57) ABSTRACT

Provided is a chitosan derivative having a high optical resolving power. Specifically provided is a chitosan derivative represented by the following Formula (I).

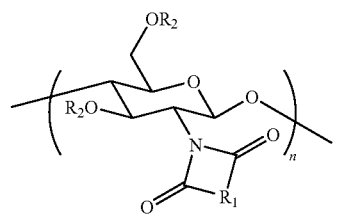

wherein $R_1$ represents an aliphatic group or an aromatic group having a carbon number of 1 to 30 which may have a substituent; $R_2$ represents a substituent originating from an isocyanic acid derivative, carboxylic acid, ester, acid halide, acid amide compound, halide compound, aldehyde, or alcohol; and n is an integer of 5 or more.

5 Claims, No Drawings

CHITOSAN DERIVATIVE AND METHOD OF PRODUCING SAME

TECHNICAL FIELD

The present invention relates to a chitosan derivative suitable as a filler for high performance liquid chromatography (HPLC), a method of producing the same, and a separating agent for enantiomeric isomers using the chitosan derivative.

BACKGROUND ART

In recent years, the importance of an optically active compound has increased even more, and a method of selectively and efficiently producing a pure optically active chiral molecule from the viewpoint of research and development not only of pharmaceuticals but also of functional materials is indispensable.

The optical resolution by HPLC has been advanced as a method which can be used for both fractional analysis and microanalysis, and the development of various chiral fillers has been made so far. Among those, a substance obtained by converting a polysaccharide which abundantly exists in nature, such as cellulose, amylose, and the like to a phenyl-carbamate derivative is widely used because such a substance has an excellent optical resolution performance of racemic bodies in a wide range including pharmaceuticals as a chiral stationary phase for HPLC.

Researches on polysaccharides other than cellulose or amylose have been made. However, a substance having an optical resolution performance equal to or higher than that of cellulose or amylose has not been obtained.

JP-A 5-163164 and JP-A 2005-17174 disclose separating agents for enantiomeric isomers using chitosan derivative.

DISCLOSURE OF THE INVENTION

The inventions disclosed in JP-A 5-163164 and JP-A 2005-17174 have room for improvement in terms of optical resolution performance.

The present invention provides a chitosan derivative having high optical resolution performance, a method of producing the same, and a separating agent for enantiomeric isomers using the chitosan derivative.

The present invention provides a chitosan derivative represented by Formula (I),

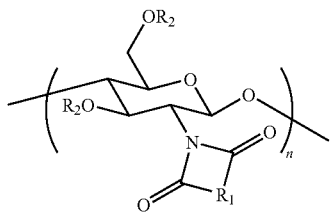

(I)

where $R_1$ represents an aliphatic group or an aromatic group having a carbon number of 1 to 30 which may have a substituent, preferably an aliphatic group or an aromatic group having a carbon number of 1 to 15 which may have a substituent; $R_2$ represents a substituent originating from an isocyanic acid derivative, a carboxylic acid, an ester, an acid halide, an acid amide compound, a halide compound, an aldehyde or an alcohol; and n is an integer of 5 or more.

Further, the present invention provides a method of producing a chitosan derivative, including the steps of: imidizing an amino group at the 2-position of chitosan and reacting hydroxyl groups at the 3- and 6-positions of chitosan with a compound selected from an isocyanic acid derivative, a carboxylic acid, an ester compound, an acid halide, an acid amide compound, a halide compound, an aldehyde and an alcohol.

Still further, the present invention provides a separating agent for an enantiomeric isomer including the chitosan derivative, use thereof, and a method of separating an enantiomeric isomer using the chitosan derivative.

The chitosan derivative of the present invention has a high optical resolution performance.

DETAILED DESCRIPTION OF THE INVENTION

The chitosan derivative of the present invention is represented by the above Formula (I), and can be obtained by the following production methods.

There is no limitation on the chitosan as a starting material and, for example, a deacetylated chitin or a commercially available chitosan may be used. As a commercially available chitosan, chitosans available by Wako Pure Chemical Industries, Ltd., Sigma-Aldrich Corporation, or Tokyo Chemical Industry Co., Ltd can be mentioned, for example.

First, an amino group at the 2-position of chitosan is imidized. There is no limitation on the imidization reaction, and a known imidization reaction can be applied.

The imidization reaction can be performed by reacting a known acid anhydride capable of introducing R1 at the amino group at the 2-position. For example, mentioned is a method that the amino group at the 2-position is subjected to N-acylation by using an acylating agent (phthalic anhydride), and dehydrating the resultant product by heating (method 1). Or, mentioned is a method of reacting an acylating agent (phthalic anhydride) with the amino group at the 2-position of chitosan in a mixed solvent of DMF/water at volume ratio of 95/5, and drying the same (method 2).

Next, the hydroxyl groups at the 3- and 6-positions of chitosan are reacted with a compound selected from an isocyanic acid derivative, carboxylic acid, ester compound, acid halide, acid amide compound, halide compound, aldehyde, and alcohol. Among those, it is desirable to react with a carboxylic acid or an isocyanic acid derivative.

As a carboxylic acid, benzoic acid, 4-methylbenzoic acid, cinnamic acid, etc. can be used, for example.

The isocyanic acid derivative is represented by R—NH—C=O where, R represents: a hydrogen atom; an aliphatic group, an aromatic group or the like, whose carbon number is 1 to 30, and preferably 1 to 14. Specifically, isocyanic acid derivatives represented by R—NH—C=O (where R represents a hydrogen atom, an isopropyl group, a phenyl group, a methylphenyl group, a 3,5-dimethylphenyl group, a chlorophenyl group, a dichlorophenyl group, a (S)-α-methylbenzyl group, etc.) can be used.

The chitosan derivative of the present invention is represented by Formula (I), and $R_1$ and $R_2$ are preferably selected from the following groups. In the chitosan derivative of the present invention, n, showing the degree of polymerization, is 5 or more, preferably 5 to 1000.

$R_1$ is preferably any one of the following.

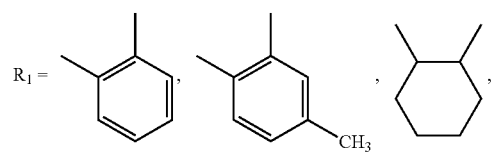

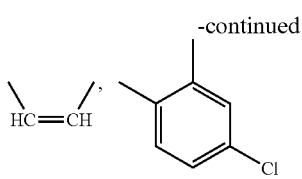

In Formula (I), it is preferable that $R_2$ be a carbamate derivative or an ester derivative. It is more preferable that $R_2$ be an aromatic carbamate derivative or an aromatic ester derivative.

It is still more preferable that $R_2$ be a carbamate derivative represented by the following formula;

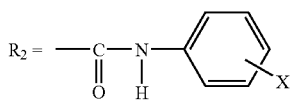

where X is 3,5-dimethyl, 3,5-dichloro, or 3,4-dichloro.

The chitosan derivative of the present invention may be used as it is or, if needed, the chitosan derivative physically or chemically carried on a carrier by a known method can be used as a separating agent for enantiomeric isomers for HPLC, etc.

As the carrier, a known porous organic carrier or a porous inorganic carrier can be used, and a porous inorganic carrier is preferable. Examples of suitable porous organic carriers are polymers, including polystyrene, polyacrylamide, polyacrylate, etc. Examples of suitable porous inorganic carriers include silica, alumina, magnesia, glass, kaolin, titanium oxide, silicates, hydroxyapatites, etc., and silica gel is particularly preferable.

When using silica gel, in order to eliminate the influence of the residual silanol on the silica gel surface and to improve the affinity with an optically active molecular compound, it is desirable to treat the surface of the silica gel by silanizing (silanizing using aminoalkylsilane), plasma treatment, etc., but no problem arises when surface treatment is not performed.

The particle diameter of a porous carrier, in particular silica gel, is preferably 1 to 300 μm, more preferably 1 to 100 μm, and still more preferably 1 to 50 μm. The average fine pore diameter thereof is preferably 200 to 8000 Å, more preferably 200 to 4000 Å, and still more preferably 300 to 2000 Å. The particle diameter of the porous carrier is substantially the particle diameter of a separating agent.

EXAMPLES

The following Examples describe the execution of the present invention. The following examples exemplify the present invention and do not limit the scope of the present invention.

The details of the reagents used in the Examples are as follows.

(1) Reagents

Chitosan prepared by deacetylating wako-100 (manufactured by Wako Pure Chemical Industries, Ltd.) in 50% NaOH three times in the condition at 120° C. for 2 hours.

Phthalic Anhydride manufactured by Wako Pure Chemical Industries, Ltd.

cis-1,2-Cyclohexanedicarboxylic Anhydride manufactured by Tokyo Chemical Industry Co., Ltd.

Succinic Anhydride manufactured by Tokyo Chemical Industry Co., Ltd.

Maleic Anhydride manufactured by Tokyo Chemical Industry Co., Ltd.

4-Methylphthalic Anhydride manufactured by Tokyo Chemical Industry Co., Ltd.

N,N-Dimethylformamide (DMF) manufactured by Tokyo Chemical Industry Co., Ltd.

3,5-Dimethylphenyl Isocyanate manufactured by Sigma-Aldrich Corporation

Isocyanic Acid 3,5-Dichlorophenyl Ester manufactured by Tokyo Chemical Industry Co., Ltd.

Lithium chloride (LiCl) manufactured by Wako Pure Chemical Industries, Ltd.

dry N,N-Dimethylacetamide (DMA) manufactured by Kanto Chemical Co., Inc.

dry pyridine manufactured by Kanto Chemical Co., Inc.

Silica gel prepared by treating the surface of Daiso gel SP-1000 (grain size: 7 μm, pore size: 100 nm) with (3-Aminopropyl)triethoxysilane (manufactured by Tokyo Chemical Industry Co., Ltd.)

Synthetic racemates or commercially available racemates (2) Measuring Equipment

HPLC: PU-980, 970-UV, 990-OR, MD-2010 (all manufactured by JASCO Corporation)

NMR: Varian Gemini-2000 (400 MHz)

IR: FT/IR-620 manufactured by JASCO Corporation

TG: SSC/5200 manufactured by Seiko Instruments Inc.

CD: J-720-L manufactured by JASCO Corporation

Example 1

N-phthaloyl chitosan
3,6-bis(3,5-dimethylphenylcarbamate)

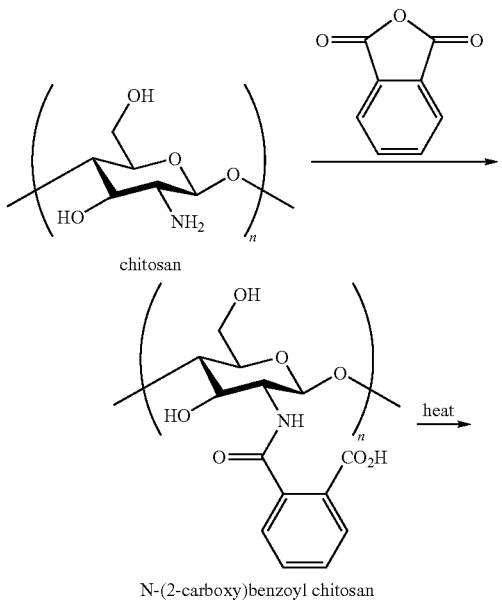

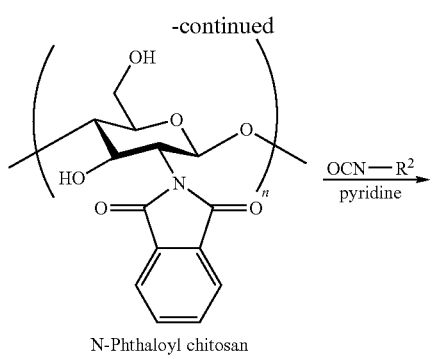

N-Phthaloyl chitosan

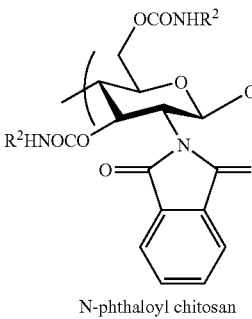

N-phthaloyl chitosan
3,6-bis(3,5-dimethylphenylcarbamate)

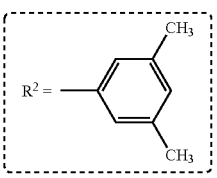

A chitosan derivative was produced according to the above reaction formula. First, 0.85 g of phthalic anhydride was added to 0.31 g of chitosan in a methanol solution containing 2% of acetic acid (pH 4), and the mixture was reacted at 35° C. for 12 hours.

Subsequently, the resultant reaction mixture was placed in an aqueous 2% sodium bicarbonate solution (pH 8), and 0.76 g of phthalic anhydride was added. The mixture was reacted at 35° C. for 12 hours to complete the acylation of the 2-position of chitosan, thereby collecting the resultant product as an acidic hydrochloride (0.60 g yield).

Then, the chitosan whose 2-position had been acylated was dried by heating under a reduced pressure at 200° C. for 5 hours to complete the cyclization by dehydration, thereby imidizing at the 2-position. The reaction was confirmed by IR. Then, 0.20 g of the chitosan whose 2-position had been imidized was taken, and 6 ml of dehydrated pyridine and 0.29 g of 3,5-dimethylphenyl isocyanate were added thereto, and then heated at 80° C. for 21 hours. The progress of the reaction was confirmed by IR. Then, 0.11 g of 3,5-dimethylphenyl isocyanate was added and the mixture was further heated at 80° C. for 5 hours to thereby complete the reaction. The reaction product was collected as an insoluble part of mixed solvents of MeOH and water at a volume ratio of 4/1. Since it was confirmed by IR that urea was contained therein, a THF-soluble part was precipitated twice to remove the urea, obtaining a 0.24 g (62%) yield. The obtained chitosan derivative was soluble in acetone, DMSO, THF, DMF, DMA, chloroform, and pyridine.

Example 2

N-phthaloyl chitosan
3,6-bis(3,5-dichlorophenylcarbamate)

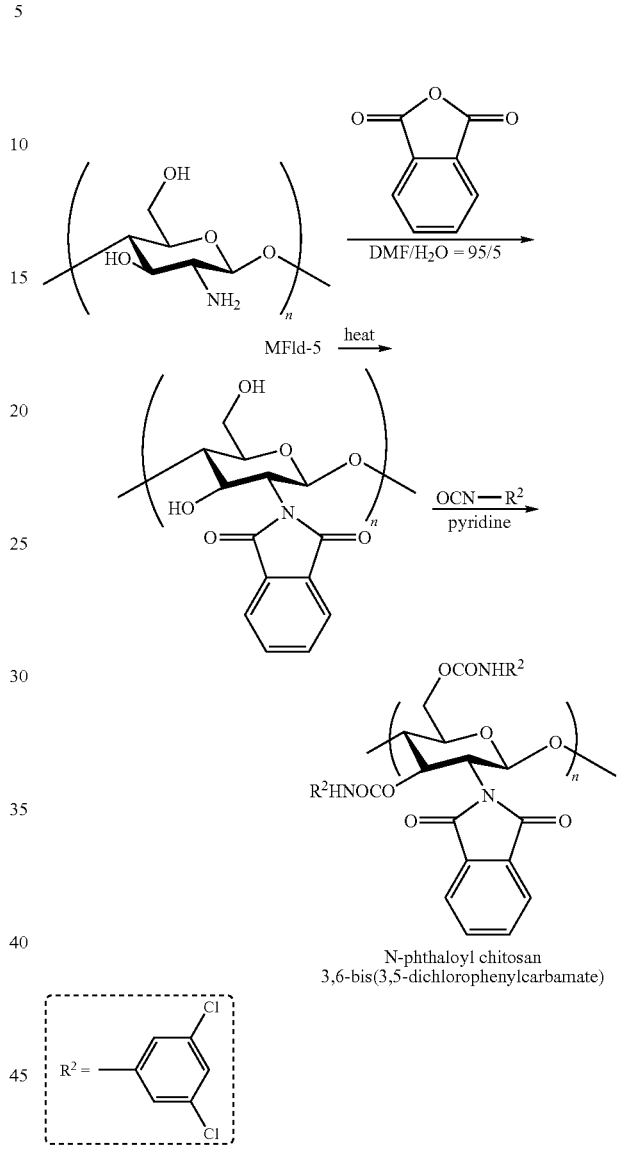

A chitosan derivative was produced according to the above reaction formula. 1.0 g of phthalic anhydride was dissolved in 20 ml of a mixed solvent at a volume ratio of 95/5 (DMF/water), and 0.40 g of chitosan was added, followed by stirring at 120° C. for 8 hours. The resultant product was poured in cold water to obtain a 0.64 g (89%) yield.

For complete imidization, 0.60 g of the resultant product was dried by heating under a reduced pressure at 200° C. for 2 hours. Then, 8 ml of dehydrated pyridine and 0.99 g of 3,5-dichlorophenyl isocyanate were added and the mixture made to react by heating at 80° C. The progress of the reaction was confirmed by IR and the resultant product was collected over 27 hours as an insoluble part of mixed solvents of Methanol and water at a volume ratio of 4/1. A THF-soluble part was re-precipitated, obtaining a 0.81 g (67%) yield. The obtained chitosan derivative was soluble in THF, DMF, DMA, and pyridine.

Example 3

N-(4-methyl)phthaloyl chitosan 3,6-bis(3,5-dimethylphenylcarbamate)

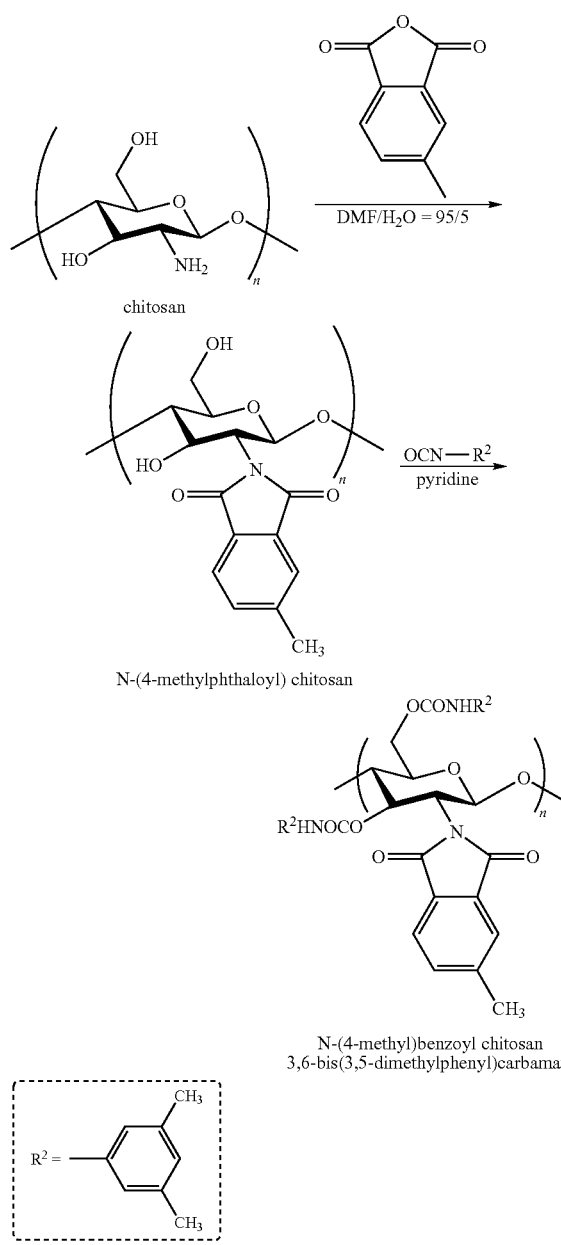

A chitosan derivative was produced according to the above reaction formula. 1.6 g of 4-methylphthalic anhydride was dissolved in 30 ml of DMF/water at a volume ratio of 95/5, and 0.51 g of chitosan was added, followed by stirring at 120° C. for 8 hours. The resultant product was poured in cold water, and washed with methanol and collected, obtaining a 0.89 g (90%) yield.

0.80 g of the resultant product was dried under a reduced pressure at 200° C. for 2 hours, and then 12 ml of pyridine and 1.2 g of 3,5-dimethylphenyl isocyanate were added. The mixture was stirred at 80° C. for 24 hours, and then was dissolved completely. The progress of the reaction was confirmed by IR, and the resultant product was collected as a methanol insoluble part, obtaining a 1.3 g (82%) yield. The obtained chitosan derivative was soluble in acetone, THF, DMF, DMA, chloroform, and pyridine.

Example 4

N-(4-methyl)phthaloyl chitosan 3,6-bis(3,5-dichlorophenylcarbamate)

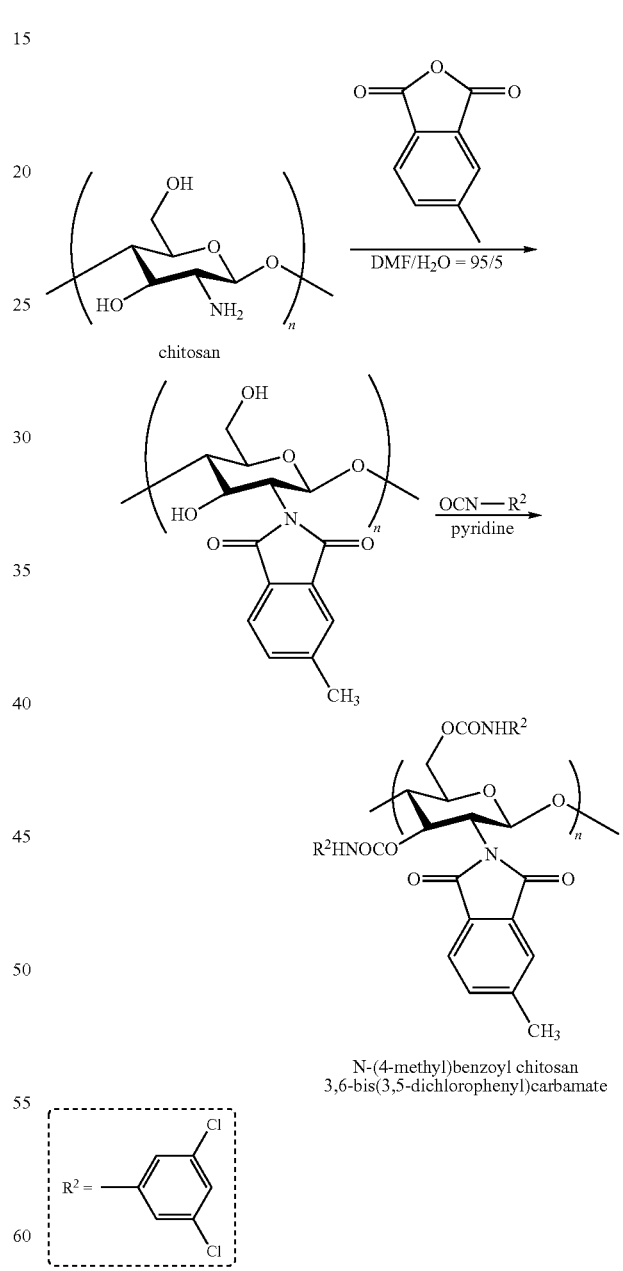

A chitosan derivative was produced according to the above reaction formula. 1.1 g of 4-methylphthalic anhydride was dissolved in 16 ml of DMF/water at volume ratio of 95/5, and 4.1 g of chitosan was added, followed by stirring at 120° C.

for 8 hours. The resultant product was poured in cold water, and washed with methanol and collected, obtaining 0.75 g (98% yield).

0.60 g of the resultant product was dried under a reduced pressure at 200° C. for 2 hours, and then 12 ml of pyridine and 1.1 g of 3,5-dichlorophenyl isocyanate were added. The mixture was stirred at 80° C. for 24 hours, and then was dissolved completely. The progress of the reaction was confirmed by IR, and the resultant product was collected as a methanol insoluble part, obtaining a 1.1 g (84%) yield. The obtained chitosan derivative was soluble in THF, DMA, and pyridine.

Example 5

Production of a Separating Agent for Enantiomeric Isomers

The chitosan derivatives obtained in Examples 1 to 4 were dissolved in THF and were carried on silica gel subjected to a surface treatment to obtain a separating agent for enantiomeric isomers. Those separating agents were separated by particle diameter with Hexane-2-propanol (9:1) and packed in a stainless steel column having a length of 25 cm and an inner diameter of 0.46 cm using Hexane-2-propanol (9:1) by the slurry method.

Column 1 (inner diameter 0.46 cm): Chitosan derivative of Example 1
Column 2 (inner diameter 0.46 cm): Chitosan derivative of Example 2
Column 3 (inner diameter 0.46 cm): Chitosan derivative of Example 3
Column 4 (inner diameter 0.46 cm): Chitosan derivative of Example 4

Application Example 1

Measurement by HPLC

Optical resolution of racemic bodies by HPLC was performed using each of the separating agents for enantiomeric isomers of Example 5. A pump (PU-980 manufactured by JASCO Corporation) was used for the measurement, and JASCO UV-970 and an optical rotation JASCO OR-990 were used for the detection. The following racemic bodies (2 to 19) were evaluated for separation ability.

Hexane-2-propanol (9:1) was mainly used as a mobile phase, and the flow rate was set as 0.5 ml/mm in the column with an inner diameter of 0.46 cm. The measurement was performed at room temperature. A theoretical plate number was determined by benzene-eluent (1:10) and $t_0$ was determined by 1,3,5-tri-tert-butylbenzene.

Volume ratio $k_1'$, $k_2'$: when a period of time during which a mobile phase passes through the column without any adsorption is defined as $t_0$ and an elution time of each enantiomer is defined as $t_1$ or $t_2$, $k_1'$ or $k_2'$ shows the adsorbability of each enantiomer to a filler, which is determined by the following formula:

$$k_1' = (t_1 - t_0)/t_0$$

Resolution coefficient $\alpha = k_2'/k_1'$

2
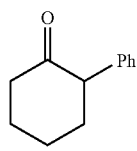

-continued

3
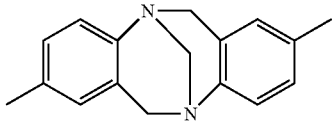

4
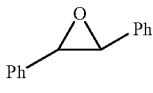

5
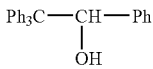

6
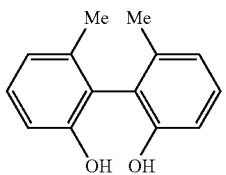

7
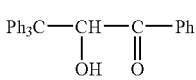

8
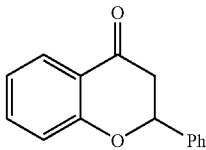

Co(acac)₃

9

10
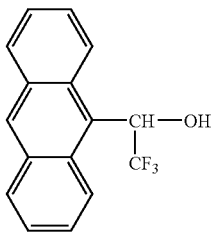

11
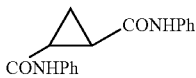

12
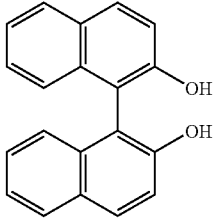

13
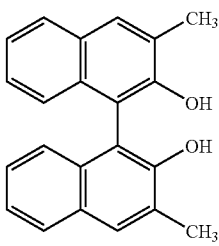

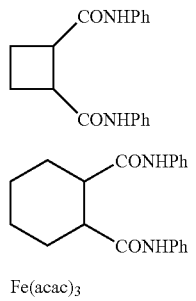
Fe(acac)₃

14

Cr(acac)₃

15

Al(acac)₃

16

In(acac)₃

17

18

19

The evaluation results of columns 1 to 4 are shown in Table 1, together with the optical resolution abilities of derivatives whose 2-, 3-, and 6-positions were reacted with isocyanate (Comparative Examples 1 and 2), synthesized previously.

TABLE 1

|   |   | Column 1 | | Column 3 | | Com. Ex. 1 | |
|---|---|---|---|---|---|---|---|
|   |   | $k_1'$ | α | $k_1'$ | α | $k_1'$ | α |
| 2 | (2-phenylcyclohexanone) | 1.45 (+) | ~1 | 1.18 (+) | 1.07 | 0.53 (−) | 1.10 |
| 3 | (Tröger's base) | 1.15 (−) | 1.23 | 0.88 (−) | ~1 | 0.30 (+) | ~1 |
| 4 | (stilbene oxide) | 0.51 (+) | ~1 | 0.34 (+) | ~1 | 0.22 (+) | ~1 |
| 5 | Ph₃C—CH(OH)—Ph | 1.26 (+) | 1.19 | 1.14 (+) | ~1 | 0.56 (+) | 1.27 |

TABLE 1-continued

| # | Structure | | | | | |
|---|---|---|---|---|---|---|
| 6 | 2,2'-dimethyl-6,6'-biphenyldiol (Me, Me, OH, OH substituents) | 2.74 (+) | 1.27 | 2.41 (+) | 1.37 | 1.31 (−) | 1.17 |
| 7 | Ph—CH(OH)—C(=O)—Ph | 3.72 (+) | ~1 | 3.65 (+) | ~1 | 1.73 (−) | 1.07 |
| 8 | 2-phenyl-chroman-4-one | 2.30 (−) | 1.27 | 1.95 (−) | 1.30 | 0.65 (−) | 1.11 |
| 9 | Co(acao)$_3$ | 1.67 (+) | 1.12 | 0.83 (+) | ~1 | 0.39 (+) | ~1 |
| 10 | 9-anthryl-trifluoromethyl-carbinol | 1.79 (+) | 1.12 | 1.81 (+) | ~1 | 1.49 (−) | 1.15 |
| 11 | trans-1,2-cyclopropane-bis(CONHPh) | 1.83 (+) | ~1 | 1.56 | 1.00 | 0.90 (−) | 1.33 |
| 12 | 1,1'-bi-2-naphthol | 10.2 (+) | 1.38 | 8.15 (+) | 1.61 | — | |
| 13 | 3,3'-dimethyl-1,1'-bi-2-naphthol | 1.32 (+) | 3.52 | 0.94 | 1.00 | — | |
| 14 | trans-1,2-cyclobutane-bis(CONHPh) | — | — | — | | | |
| 15 | trans-1,2-cyclohexane-bis(CONHPh) | — | — | — | | | |

TABLE 1-continued
| | | | | | | |
|---|---|---|---|---|---|---|
| 16 | Fe(acac)$_3$ | — | — | — | | |
| 17 | Cr(acac)$_3$ | — | — | — | | |
Isocyanate to 3-, 6-positions
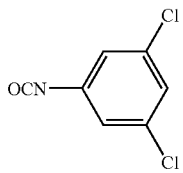
Anhydride to 2-position
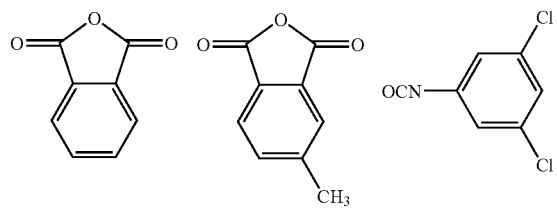
| | Column 2 | | Column 4 | | Com. Ex. 2 | |
|---|---|---|---|---|---|---|
| | $k_1'$ | α | $k_1'$ | α | $k_1'$ | α |
| 2 | 1.25 (−) | 1.11 | 1.01 (−) | 1.09 | 3.39 (−) | 1.10 |
| 3 | 0.82 (+) | 1.22 | 0.64 (+) | 1.28 | 1.53 (−) | 1.08 |
| 4 | 0.35 (−) | ~1 | 0.22 (+) | 1.20 | 0.67 (+) | ~1 |
| 5 | 0.98 (−) | ~1 | 0.53 (+) | 1.12 | 2.04 | 1.00 |
| 6 | 1.57 (+) | ~1 | 2.01 (+) | ~1 | 1.75 (−) | 1.10 |
| 7 | 3.31 (−) | 1.26 | 2.74 (−) | 1.17 | 5.43 | 1.00 |
| 8 | 2.32 (+) | 1.11 | 1.56 (−) | 1.20 | 2.44 | 1.00 |
| 9 | 1.12 (+) | 1.44 | 0.52 (+) | 1.84 | 2.61 (+) | 1.06 |
| 10 | 0.57 | 1.00 | 0.53 | 1.00 | 0.76 (−) | 1.14 |
| 11 | 0.75 (+) | 1.46 | 0.80 (+) | 1.38 | 0.92 (+) | ~1 |
| 12 | — | | — | | — | |
| 13 | — | | — | | — | |
| 14 | 1.10 (+) | 1.28 | 1.12 (+) | 1.38 | — | |
| 15 | — | | 0.43 (+) | 1.00 | — | |
| 16 | 0.51 | 1.00 | 0.48 | 1.00 | — | |
| 17 | 0.81 (−) | 1.23 | 0.44 (−) | 1.51 | — | |
Eluent: Hexane/IPA = 9/1, Flow rate: 0.5 ml/min, Column: 25 × 0.46 (i.d.) cm.
Example 6
N-(1,2-cyclohexanedicarbonyl)chitosan 3,6-bis(3,5-dimethylphenylcarbamate)
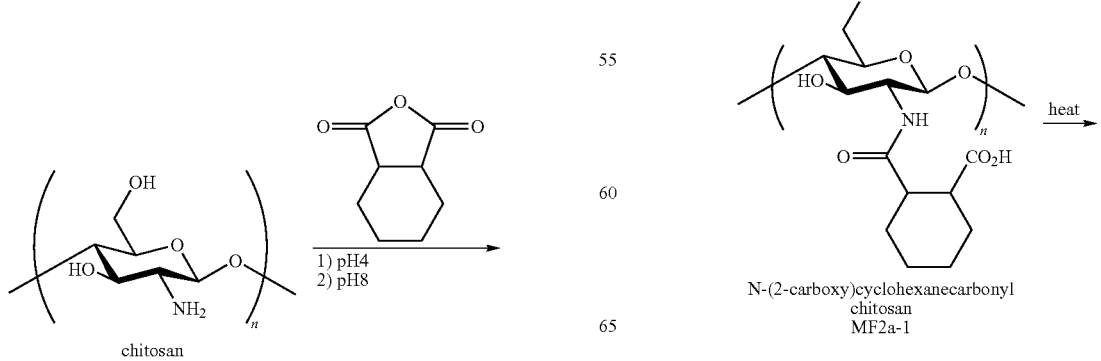
N-(2-carboxy)cyclohexanecarbonyl chitosan
MF2a-1

-continued

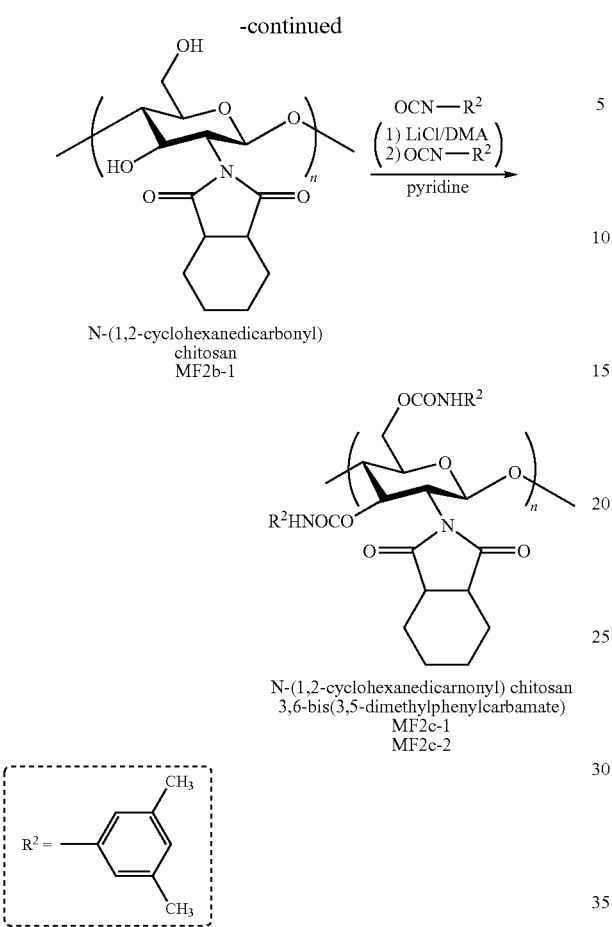

N-(1,2-cyclohexanedicarbonyl) chitosan
MF2b-1

N-(1,2-cyclohexanedicarnonyl) chitosan
3,6-bis(3,5-dimethylphenylcarbamate)
MF2c-1
MF2c-2

A chitosan derivative was produced according to the above reaction formula. First, for N-acylation of 0.20 g of chitosan (which was obtained by repeatedly (three times) deacetylating chitosan of wako-100 (manufactured by Wako Pure Chemical Industries, Ltd.) at 120° C. for 2 hours in an aqueous 50% NaOH solution), 0.54 g of cis-1,2-cyclohexanedicarboxylic anhydride was added under acidic conditions for reaction for 11 hours, and 0.51 g of anhydride was added under basic conditions for reaction for 12 hours. The resultant product was collected under acidic conditions, obtaining a 0.26 g (68%) yield (MF2a-1). The resultant product was heated at 220° C. under a reduced pressure for 5 hours, and then the progress of imidization was observed by IR (MF2b-1). 86 mg of the resultant product was taken and reacted with 0.24 g of 3,5-dimethylphenyl isocyanate in dehydrated pyridine at 80° C. 21 hours later, 0.23 g of isocyanate was further added. The progress of the reaction was confirmed by IR after 27 hours and a methanol insoluble part was collected, but the reaction nonuniformly progressed to the end. The resultant product was stirred and washed in DMSO, obtaining 62 mg (37% yield) of an insoluble part (MF2c-1).

Since the reaction might not progress completely, 0.24 mg of a newly dried N-(1,2-cyclohexanedicarbonyl) chitosan was swollen in 0.75 ml of DMA. Then, 65 mg of LiCl, 0.4 ml of pyridine, and 0.21 g of isocyanate were added and reacted for 20 hours. Then, 0.22 g of isocyanate was newly added, but the reaction nonuniformly progressed. Then, 4 hours later, the resultant product was collected as a methanol insoluble part, and 21 mg (40%) of the reaction product was obtained (MF2c-2).

Example 7

N-malenoyl chitosan
3,6-bis(3,5-dimethylphenylcarbamate)

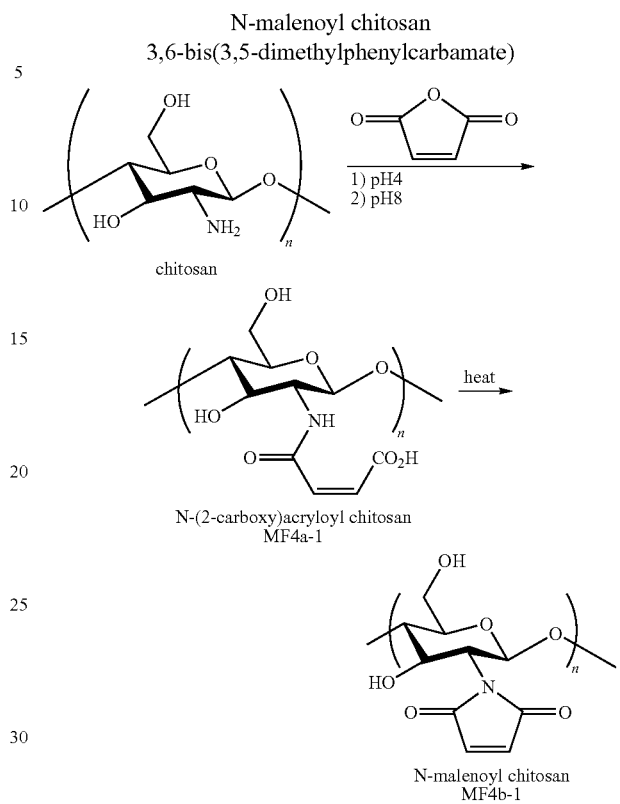

A chitosan derivative was produced according to the above reaction formula. First, the reaction was performed as shown in the scheme of the following Method 1. 0.36 g of maleic anhydride was added to 0.21 g of chitosan under acidic conditions for reaction for 12 hours, and then 0.35 g of anhydride was added under basic conditions. However, the white precipitate which was deposited remained insoluble, even after 12 hours. When the insoluble part and the soluble part were separated and only the soluble part was made acidic, the apparent progression of the reaction was confirmed by IR spectrum, and a 27 mg (8%) yield was obtained (MF4a-1). In contrast, no reaction progressed with the insoluble part, and the reaction was further performed. However, only a comparable yield was obtained from the soluble part and the insoluble part remained unreacted. Next, 17 mg of the resultant product was heated under a reduced pressure at 200° C. for 5 hours, obtaining 15 mg (95%) of a cyclic compound (MF4b-1).

Example 8

N-malenoyl chitosan
3,6-bis(3,5-dimethylphenylcarbamate)

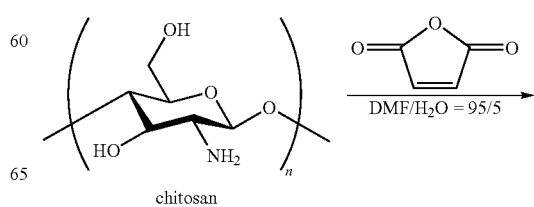

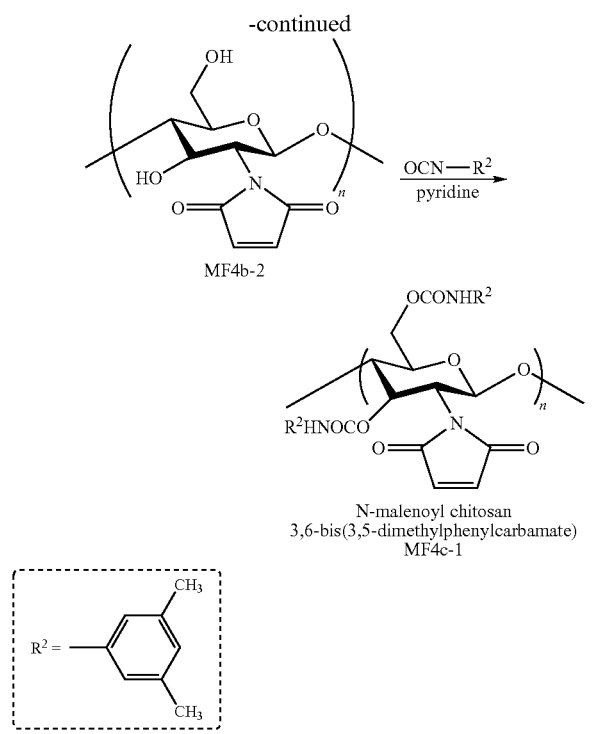

MF4b-2

N-malenoyl chitosan
3,6-bis(3,5-dimethylphenylcarbamate)
MF4c-1

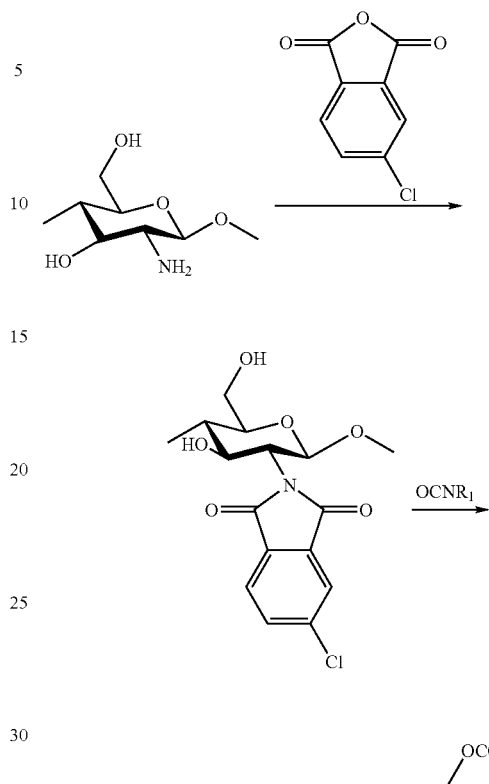

A chitosan derivative was produced according to the above reaction formula. 0.34 g of maleic anhydride was dissolved in 10 ml of a mixed solvent of DMF and water, and 0.20 g of chitosan was added, followed by a half-reaction at 120° C. for 8 hours. The resultant product was poured in cold water, obtaining 0.23 g (77%) yield (MF4b-2).

In this case, the progress of the reaction was confirmed. Thus, 98 mg of this derivative was dried at 200° C., and then 4 ml of pyridine and 240 mg of 3,5-dimethylphenyl isocyanate were added for reaction. 21 hours later, due to a large amount of insoluble parts, 96 mg of isocyanate was added for reaction for a further 6 hours. However, the insoluble parts were not completely dissolved, and collected as an insoluble part of mixed solvents of methanol and water at a volume ratio of 5/1. The yield was 172 mg (80%) (MF4c-1).

Example 9

N-(4-chloro)phthaloyl chitosan tris(3,5-dimethylphenylcarbamate)

3.6 g of 4-chlorolphthalic anhydride was dissolved in 30 ml of DMF/water at a volume ratio of 95/5, and 1.0 g of chitosan was added. The mixture was stirred at 120° C. for 8 hours, and thus a gel was formed. The resultant product was poured in 200 mL of cold-water, and collected by centrifugal separation, followed by drying by heating using an oven at 200° C. for 1.5 hours, obtaining a 2.5 g (95%) yield (MF9b-2).

1.0 g of the resultant product was dried, and then 15 ml of pyridine and 1.3 g of 3,5-dimethylphenyl isocyanate were added, followed by stirring. Since the viscosity increased 2 hours later, 7 mL of pyridine was added. 1.0 g of isocyanate was added again 4 hours later, and the mixture was stirred for a further 16 hours. The progress of the reaction was confirmed by IR, and then the resultant product was re-precipitated in methanol and collected, obtaining a 1.7 g (92%) yield (MF9c-2).

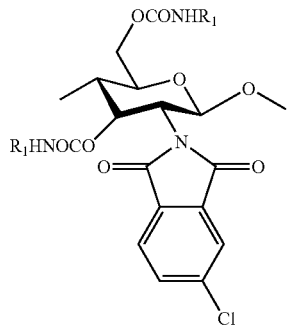

Example 10

N-(4-chloro)phthaloyl chitosan tris(3,5-dichlorophenylcarbamate)

1.0 of MF9b-2 was dried in the same manner as in Example 9. Then, 15 ml of pyridine and 1.6 g of 3,5-dichlorophenyl isocyanate were added, followed by stirring. 0.8 g of isocyanate was added again 6 hours later and stirred for a further 16 hours. The progress of the reaction was confirmed by IR and then the resultant product was re-precipitated in methanol and collected, obtaining a 2.3 g (99%) yield (MF9d-2).

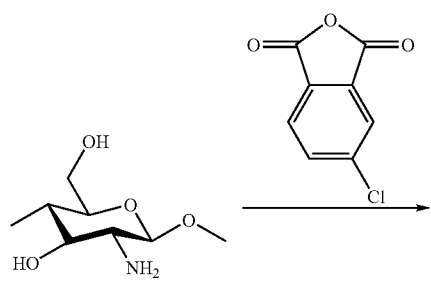
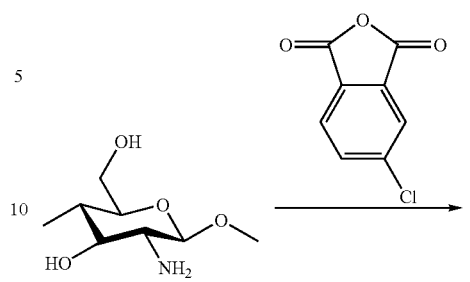
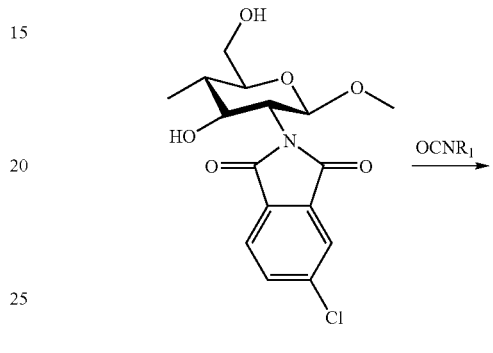
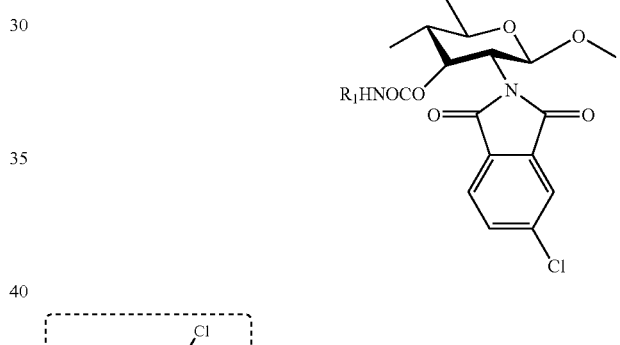
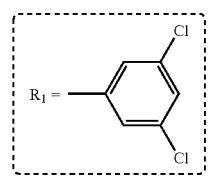

Example 11

N-(4-chloro)phthaloyl chitosan tris(3,4-dichlorophenylcarbamate)

0.4 of MF9b-2 was dried in the same manner as in Example 9. Then, 8 ml of pyridine and 1.2 g of 3,4-dichlorophenyl isocyanate were added, followed by stirring at 80° C. 0.8 g of isocyanate was added again 11 hours later, and stirred for a further 10 hours. The progress of the reaction was confirmed by IR and then the resultant product was re-precipitated in methanol and collected, obtaining a 0.80 g (95%) yield (MF9q-1).

Example 12

N-phthaloyl chitosan tris(3,4-dichlorophenylcarbamate)

5.7 g of phthalic anhydride was dissolved in 120 ml of DMF/water at volume ratio of 95/5, and 2.0 g of chitosan was added. The mixture was stirred at 120° C. for 20 hours and, thus, a gel was formed. The resultant product was poured in 200 mL of cold-water, and collected by centrifugal separation, obtaining a 3.3 g (90%) yield (MF1b-9).

1.0 g of the resultant product was dried, and then 20 ml of pyridine and 1.7 g of 3,4-dimethylphenyl isocyanate were added, followed by stirring. 1.2 g of isocyanate was added again hours later and the mixture was stirred for a further 12 hours. The progress of the reaction was confirmed by IR and then the resultant product was re-precipitated in methanol and collected, obtaining a 2.4 g (99%) yield (MF1q-1).

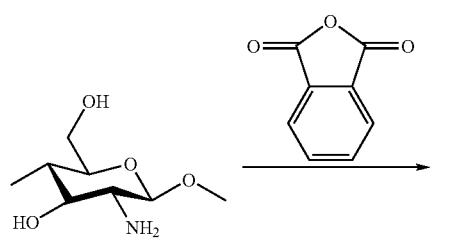
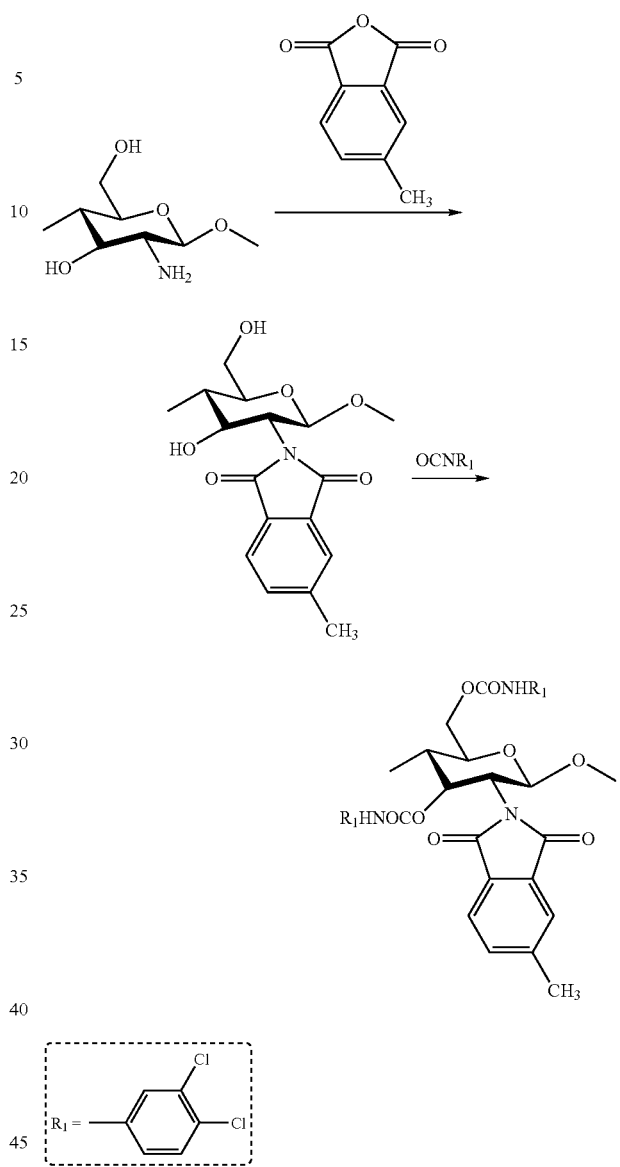

Example 13

N-(4-methyl)phthaloyl chitosan tris(3,4-dichlorophenylcarbamate)

6.0 g of (4-methyl)phthalic anhydride was dissolved in 120 ml of DMF/water at volume ratio of 95/5, and 2.0 g of chitosan was added. The mixture was stirred at 120° C. for 11 hours and, thus, a gel was formed. A supernatant was removed, the resultant product was poured in 200 mL of cold-water and collected by centrifugal separation, obtaining a 3.3 g (86%) yield (MF5b-5).

1.0 g of the resultant product was dried, and then 20 ml of pyridine and 1.7 g of 3,4-dimethylphenyl isocyanate were added, followed by stirring at 80° C. Then, the viscosity increased 14 hours later, and, thereafter, 10 mL of pyridine and 0.5 g of isocyanate were added, followed by stirring for a further 8 hours. The progress of the reaction was confirmed by IR and then the resultant product was re-precipitated in methanol and collected, obtaining a 2.3 g yield. A DMSO insoluble part was removed and the resultant product was precipitated again in methanol, followed by drying, thereby obtaining a 1.6 g (72%) yield (MF5q-1-re).

Example 14

Preparation of a Separating Agent for Enantiomeric Isomers

The chitosan derivatives obtained in Examples 9 to 13 were applied to silica gel in the same manner as in Example 5 and the resultant product was packed in a column (inner diameter of 0.46 cm). The column was referred to as follows.

N-(4-chloro)phthaloyl chitosan tris(3,5-dimethylphenylcarbamate) (MF9c-2)→MFp-25
N-(4-chloro)phthaloyl chitosan tris(3,5-dichlorophenylcarbamate) (MF9d-2)→MFp-26
N-(4-chloro)phthaloyl chitosan tris(3,4-dichlorophenylcarbamate) (MF9q-1)→MFp-27
N-phthaloyl chitosan tris(3,4-dichlorophenylcarbamate) (MF1q-1)→MFp-18
N-(4-methyl)phthaloyl chitosan tris(3,4-dichlorophenylcarbamate) (MF5q-1-re)→MFp-19

Application Example 2

Measurement by HPLC

Each column of Example 14 was evaluated for the optical resolution performance of a chiral stationary phase in the same manner as in Application Example 1. The evaluation results are shown below.

TABLE 2

Resolution of Racemates on N-Phthaloyl Chitosan 3,6-Bis(phenylcarbamate)

| | MFp-25 | | MFp-26 | | MFp-27 | | MFp-18 | | MFp-19 | |
|---|---|---|---|---|---|---|---|---|---|---|
| | $k_1'$ | $\alpha$ | $k_1'$ | $\alpha$ | $k_1'$ | $\alpha$ | $k_1'$ | $\alpha$ | $k_1'$ | $\alpha$ |
| 2 | 1.21 | 1.00 | 2.39 (−) | ~1 | 1.95 (−) | ~1 | 1.67(−) | ~1 | 1.69(−) | ~1 |
| 3 | 1.02 (+) | 1.15 | 1.25 (+) | 1.23 | 0.92 (+) | 1.17 | 0.80 (+) | 1.09 | 0.71 (+) | 1.18 |
| 4 | 0.42 (+) | ~1 | 0.48 (+) | 1.10 | 0.38 (+) | ~1 | 0.30 (+) | 1.15 | 0.33 (+) | 3.26 |
| 5 | 1.03 (+) | 1.08 | 0.84 (+) | 1.26 | 0.76 (+) | ~1 | 0.76 (+) | ~1 | 0.75 (+) | ~1 |
| 6 | 2.67 (+) | 1.13 | 1.94 (+) | 1.14 | 1.69 (+) | 1.09 | 0.82 (+) | 1.18 | 0.96 (+) | 1.07 |
| 7 | 3.18 (−) | 1.07 | 4.97 (−) | 1.57 | 3.69 (−) | 1.12 | 2.92 (−) | 1.08 | 3.34 (−) | 1.14 |
| 8 | 1.89 (−) | 1.25 | 3.07 (−) | 1.11 | 2.22 (−) | 1.10 | 1.88 (−) | 1.05 | 1.92 (−) | 1.05 |
| 9 | 0.97 (+) | 1.25 | 1.50 (+) | 1.42 | 1.64 (+) | 1.42 | 1.53 (+) | 1.54 | 0.96 (+) | 1.45 |
| 10 | 1.38 | 1.00 | 0.68 | 1.00 | 0.63 | 1.00 | 0.66 | 1.00 | 0.85 | 1.00 |
| 11 | 1.41 (+) | ~1 | 1.08 (+) | 1.53 | 0.89 (+) | 1.63 | 0.88 (+) | 1.71 | 0.93 (+) | 1.78 |

Column: 25 × 0.46 (i.d.) cm, Flow rate: 0.5 ml/min, Eluent: Hex/IPA = 90/10.
Racemates

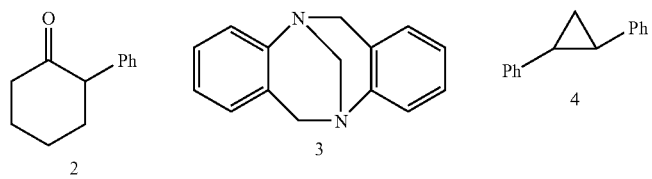

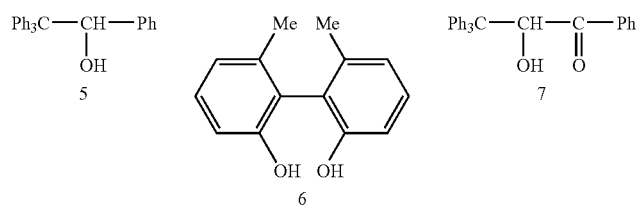

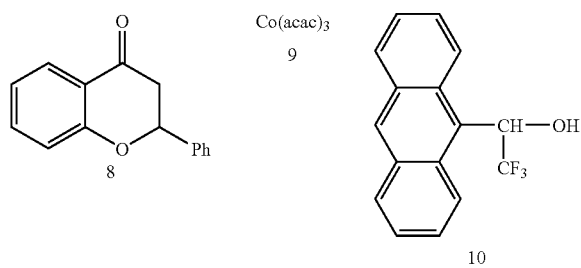

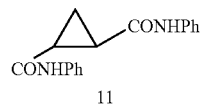

The invention claimed is:

1. A chitosan derivative represented by Formula (I),

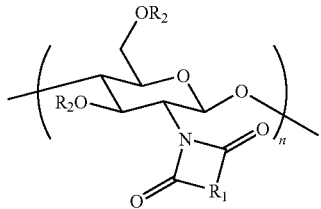

wherein R₁ represents an aliphatic group or an aromatic group, having a carbon number of 1 to 30, which may have a substituent; R₂ is represented by the following formula

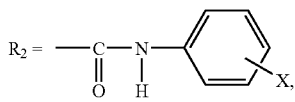

wherein X represents 3,5-dimethyl, 3,5-dichloro or 3,4-dichloro; and n is an integer of 5 or more.

2. The chitosan derivative according to claim 1, wherein R₁ in Formula (I) is selected from the following formulae

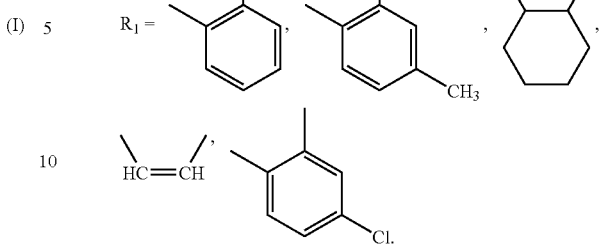

3. A method of producing the chitosan derivative according to claim 1, comprising the steps of:
   imidizing an amino group at the 2-position of chitosan; and
   reacting hydroxyl groups at the 3- and 6-positions of the chitosan with an isocyanic acid derivative.

4. A separating agent for an enantiomeric isomer, comprising the chitosan derivative according to claim 1.

5. In a method of separating an enantiomeric isomer from a mixture containing the enantiomeric isomer, the improvement comprising contacting the mixture with a separating agent comprising the chitosan derivative of claim 1.

* * * * *